United States Patent
Yamamoto et al.

(10) Patent No.: US 10,069,987 B2
(45) Date of Patent: Sep. 4, 2018

(54) IMAGE PROCESSING DEVICE WITH OPERATION PANEL RESPONDING BY VIBRATION

(71) Applicant: Konica Minolta, Inc., Chiyoda-ku, Tokyo (JP)

(72) Inventors: Mineo Yamamoto, Toyokawa (JP); Isao Watanabe, Toyohashi (JP); Toshikazu Higashi, Toyokawa (JP); Hiroshi Yamaguchi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/378,812

(22) Filed: Dec. 14, 2016

(65) Prior Publication Data
US 2017/0171406 A1    Jun. 15, 2017

(30) Foreign Application Priority Data
Dec. 15, 2015 (JP) ................................. 2015-244359

(51) Int. Cl.
  *G06K 15/00* (2006.01)
  *H04N 1/00* (2006.01)
  *G06F 3/01* (2006.01)

(52) U.S. Cl.
  CPC ......... *H04N 1/00549* (2013.01); *G06F 3/016* (2013.01); *H04N 1/0032* (2013.01);
  (Continued)

(58) Field of Classification Search
  USPC .................................. 358/1.1–3.29, 1.11–1.18
  See application file for complete search history.

(56) References Cited

U.S. PATENT DOCUMENTS

| 7,292,227 B2 * | 11/2007 | Fukumoto | G01C 21/3664 |
| | | | 178/18.04 |
| 2002/0149561 A1 * | 10/2002 | Fukumoto | G01C 21/3664 |
| | | | 345/156 |

(Continued)

FOREIGN PATENT DOCUMENTS

| JP | 2004-040313 A | 2/2004 |
| JP | 2005-252971 A | 9/2005 |

(Continued)

OTHER PUBLICATIONS

Ito Kenji, et al., "Ningen-Kogaku handbook (in Japanese)" Jun. 20, 2013, Asakura Shoten, 5 pages, described in Specification.

(Continued)

*Primary Examiner* — Marcellus Augustin
(74) *Attorney, Agent, or Firm* — Buchanan Ingersoll & Rooney PC

(57) ABSTRACT

A touch panel has a display region for an operation screen and senses an outer object touching the display region. A vibrator unit applies vibration to the display region. In response to the touch panel sensing the object, a response controller unit instructs the vibrator unit to apply to the display region vibration responsive to the object. The response controller unit checks whether an image processing unit is under waiting or operating condition at the time the touch panel senses the object, and when the image processing unit is under the operating condition, sets the responsive vibration to a level lower than when the image processing unit is under the waiting condition.

13 Claims, 9 Drawing Sheets

(52) U.S. Cl.
CPC ... *H04N 1/00411* (2013.01); *G06F 2203/014* (2013.01); *H04N 2201/0094* (2013.01); *H04N 2201/02491* (2013.01)

(56) References Cited

U.S. PATENT DOCUMENTS

| | | | |
|---|---|---|---|
| 2008/0153554 A1* | 6/2008 | Yoon | H04M 1/72547 |
| | | | 455/567 |
| 2009/0154959 A1* | 6/2009 | Sato | G03G 21/1666 |
| | | | 399/211 |
| 2010/0296659 A1 | 11/2010 | Tanaka | |
| 2016/0110014 A1 | 4/2016 | Aono | |

FOREIGN PATENT DOCUMENTS

| | | | | |
|---|---|---|---|---|
| JP | 2006-150865 | * | 6/2006 | B41J 29/00 |
| JP | 2006-150865 A | | 6/2006 | |
| JP | 2009-175558 A | | 8/2009 | |
| JP | 2009-218911 A | | 9/2009 | |
| JP | 2010-282346 | * | 12/2010 | G06F 3/041 |
| JP | 2010-282346 A | | 12/2010 | |
| WO | 2015/115447 A1 | | 8/2015 | |

OTHER PUBLICATIONS

Office Action (Notice of Reasons for Refusal) dated Mar. 6, 2018, by the Japanese Patent Office in corresponding Japanese Patent Application No. 2015-244359 and English Translation of the Office Action. (6 pages).

\* cited by examiner

IMAGE PROCESSING DEVICE WITH OPERATION PANEL RESPONDING BY VIBRATION

This application is based on an application No. 2015-244359 filed in Japan, the contents of which are hereby incorporated by reference.

BACKGROUND OF THE INVENTION

1. Field of the Invention

The invention relates to an image processing device, in particular, a technology of enabling a touch panel implemented on the operation panel of the device to respond by vibration to a touch that the touch panel senses.

2. Background

Touch panels have now become established as input devices essential for operation of electric appliances. Indeed, touch panels are included as standard equipment in automated teller machines (ATM) of banks, and in automatic ticket machines of stations. Touch panels are standard input devices of smartphones and tablet terminals, which have become widespread at an explosive pace. In recent years, home electric appliances also include many types with operation panels in which touch panels are implemented.

Such widespread use of touch panels is largely due to a good operational feeling that touch panels provide to users. With touch panels, users can directly touch and operate graphic user interface (GUI) components, such as icons and virtual buttons, displayed on operation screens. The GUI components are hereinafter referred to as "gadgets." The users have to handle neither keyboards nor mouses. This probably prevents users inexperienced with keyboards and mouses from falling into a situation in which the users are bewildered by operation of gadgets. Such easy-to-grasp operations enable the touch panels to provide users with a good operational feeling.

A known method of improving this operational feeling is, for example, a technology of making a touch panel respond by light or sound to a touch that the touch panel senses. More concretely, the touch panel, when sensing the touch of a user's finger or the like, instructs the display device to change the appearance of gadgets such as their colors, shapes, and brightness, or the speaker to produce electronic sounds. Such visual or auditory response allows the user to perceive "reaction" to the touch on the touch panel, which is also called "click feeling" or "feedback," thus convincing the user that his/her operation by the touch has been accepted by the device equipped with the touch panel.

As a technique of improving such feedback effect, a touch panel equipped with force-feedback (FFB) function has been developed recently. See for example JP 2006-150865 and JP 2010-282346. The "FFB function" means a function of vibrating a touch panel, in particular its surface, in response to a touch that the touch panel senses. Such vibration, which is hereinafter referred to as "responsive vibration," enables a user to feel as if the reaction to the user's touch on a virtual button were tactile feedback from a pushed mechanical button. Since the responsive vibration is a tactile response, it can be sufficiently perceived by a user who is kind of bad at sensing change in appearance of gadgets or electronic sounds, such as a child and an elderly person.

SUMMARY OF THE INVENTION

Use of touch panels grows in image processing devices such as printers, copiers, scanners, and facsimile machines. When operating such a device, a user cannot usually focus on staring at the touch panel. Since the device generally produces large operation sounds, or is often located at a noisy place such as an office, the electronic sounds are hard to hear for the user. In order to improve operational feelings that the touch panel mounted on the device provides the user, implementing the FFB function in the touch panel is desirable.

Operation of image processing devices is, however, vulnerable to external vibration and shock. For example, if external vibration or shock received by a scanner displaces a document that the auto document feeder (ADF) is conveying, or a light source or image sensor element that is moving across the platen, the scanner captures a distorted image. If external vibration or shock received by an inkjet printer displaces the head during printing, the printer prints a distorted image. There is, thus, the risk that excessively large levels of responsive vibration of a touch panel might degrade the reliability of the image processing device on which the touch panel is mounted.

An object of the invention is to solve the above-mentioned problems, and in particular, to provide an image processing device enabling a user to perceive responsive vibration of its operation panel by using the FFB function, while avoiding any adverse effect on its own image processing.

The image processing device according to one aspect of the present invention is an image processing device comprising: an image processing unit configured to capture an image from a sheet and/or print an image on a sheet; a housing supporting the image processing unit inside itself; and an operation panel mounted on the housing and configured to display an operation screen for the image processing unit to accept user operation on the operation screen, the operation panel including: a touch panel having a display region for the operation screen and configured to sense an outer object touching the display region; a vibrator unit configured to apply vibration to the display region; and a response controller unit configured to, in response to the touch panel sensing the object, instruct the vibrator unit to apply to the display region vibration responsive to the object, the response controller unit also configured to check whether the image processing unit is under waiting or operating condition at the time the touch panel senses the object, and when the image processing unit is under the operating condition, set the responsive vibration to a level lower than when the image processing unit is under the waiting condition.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the drawings.

DETAILED DESCRIPTION

The following is a description of embodiments of the invention with reference to the drawings.

Appearance of Image Forming System

Figure 1A:
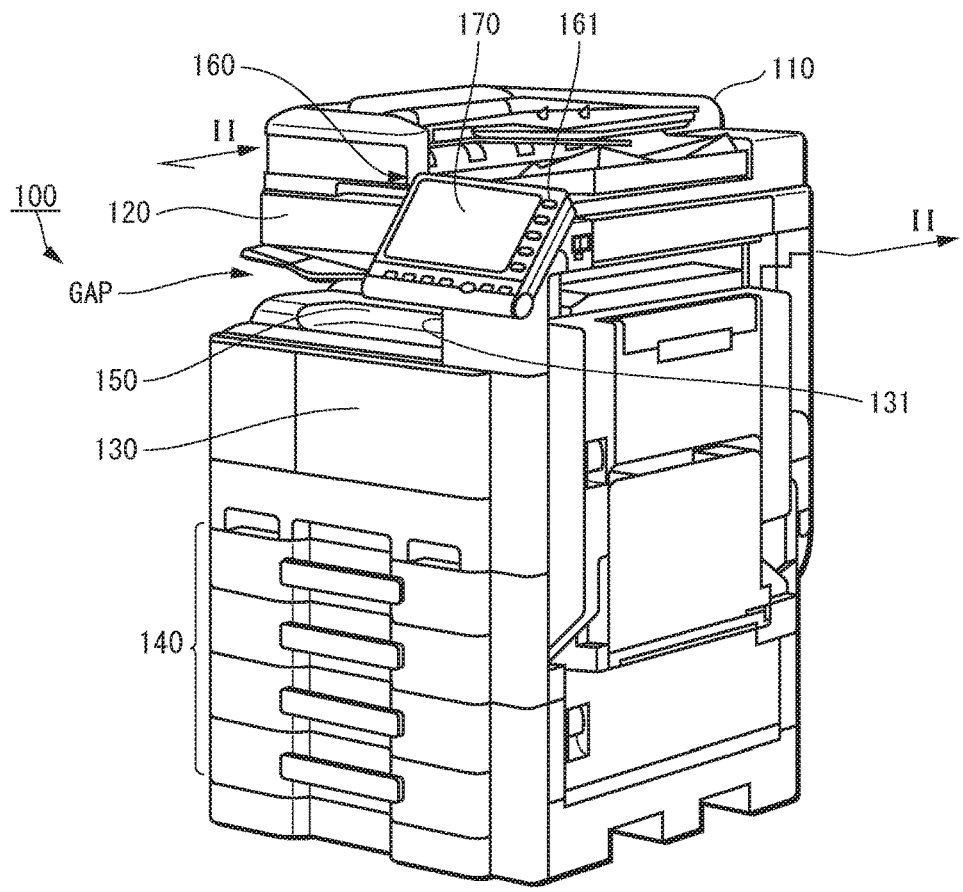
FIG. 1A is a perspective view of the appearance of an image processing device according to an embodiment of the invention.

FIG 1A is a perspective view of the appearance of an image processing device according to an embodiment of the invention. The image processing device 100 is a multifunction peripheral (MFP) of the in-body paper ejection type, which combines image processing functions of a scanner, color copier, and color laser printer. Referring to FIG. 1A, the MFP 100 has, on the top surface of its body, an auto document feeder (ADF) 110. In an upper portion of the body directly below the ADF 110, the MFP 100 houses a scanner 120, and in a lower portion of the body, it includes a printer 130 with a lower portion to which paper cassettes 140 are attached to be able to slide out like drawers. In a space GAP between the scanner 120 and the printer 130, the MFP 100 has an ejection tray 150, and next to it, an ejection slot 42, from which the MFP 100 ejects sheets to the ejection tray 150. On a front surface of the body located next to the space GAP, the MFP 100 has an operation panel 160, which includes a touch panel 170 embedded in its front surface and surrounded by a variety of mechanical push buttons 161. The touch panel 170 displays a graphical user interface (GUI) screen, such as an operation screen and input screens for various items of information, and accepts user operation through gadgets included in the screens, such as an icon, virtual button, menu, and tool bar.

Configuration of Touch Panel

Figure 1B:
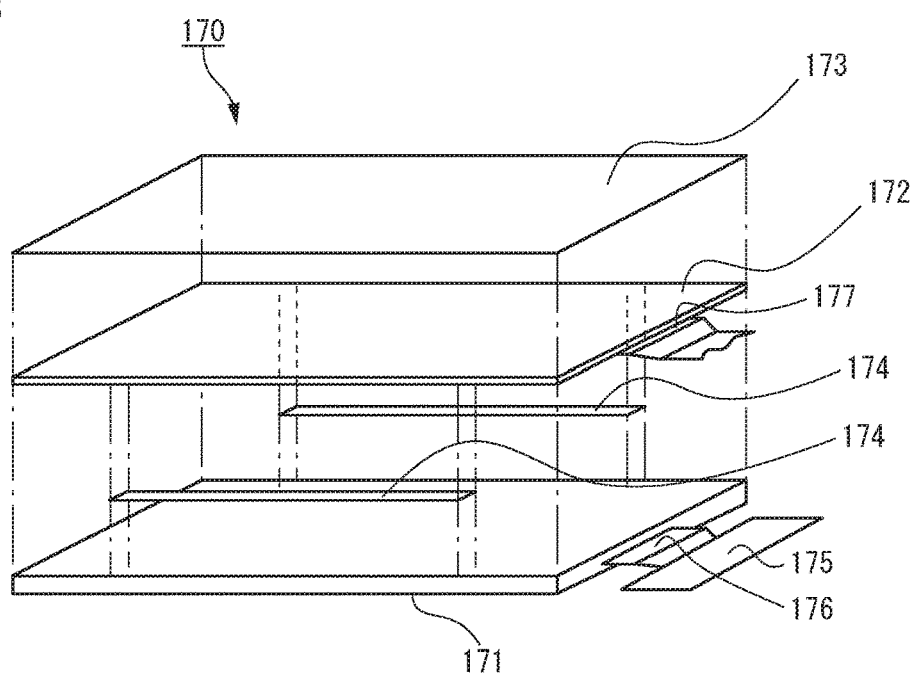
FIG. 1B is a perspective exploded view of the touch panel shown in FIG. 1A.

FIG. 1B is a perspective exploded view of the touch panel shown in FIG. 1A. The touch panel 170 includes a stack of a liquid crystal display (LCD) 171, a touchpad 172, a cover 173, and a piezoelectric actuator 174.

The LCD 171 modulates uniform light from its backlight pixel by pixel according to voltages applied from a control circuit board 175 via a flexible printed circuit board (FPC) 176, thus changing the brightness of the screen pixel by pixel to display an image on it.

The touchpad 172, which is stacked on the screen of the LCD 171, includes the structure of a resistive type, for example. More specifically, the touchpad 172 includes a substrate that is made of transparent glass, for example, and coated on its upper surface with a transparent conductive film made of, for example, indium tin oxide (ITO), which faces across spacers another transparent conductive film coated on a flexible layer. The two conductive films are connected through cables 177 to an external electronic circuit, and from it, alternately receive electric current supply. Under this condition, a touch of a user's finger on the touch panel 170 locally presses down the upper conductive film to bring it into contact with the lower one at the position of the touch, thus making the two conductive films short-circuit, which changes the electric potential of either of the two conductive films, whichever is not receiving the current supply. From this change of the potential, the touch is detected, and from the amount of the change, the coordinates of the touch is calculated.

The cover 173, which is a transparent film made of resin such as polyethylene terephthalate (PET), is placed over the top surface of the touchpad 172 to protect it from external dust and moisture.

The piezoelectric actuator 174 is a strip-shaped, thin-film member made of piezoelectric material such as lead zirconate titanate (PZT). A plurality of the piezoelectric actuators 174 (FIG. 1B shows two) are bonded on the rim of the touchpad 172 along its circumference, for example. During application of a voltage, the piezoelectric actuator 174 deforms, e.g. extends longitudinally, and when the voltage is removed, the actuator returns to its original form, e.g. shrinks to its original length. When the application of the voltage is repeated periodically, the piezoelectric actuator 174 vibrates at the repeated frequency of the application.

Configuration of ADF

Figure 2A:
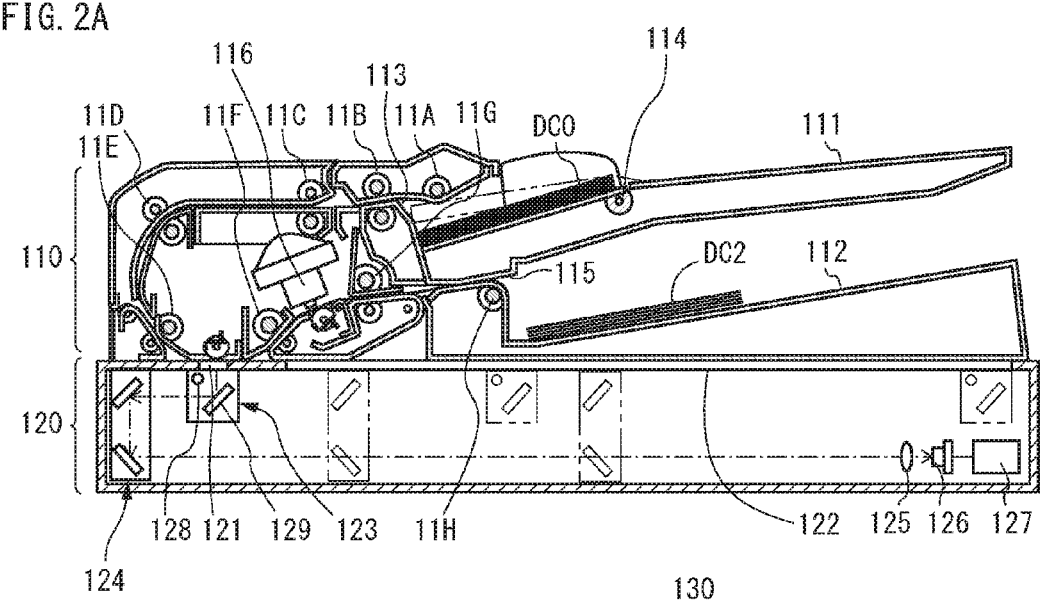
FIG. 2A is a cross-section view of the ADF along the line II-II shown in FIG. 1A.

FIG. 2A is a cross-section view of the ADF 110 along the line II-II shown in FIG. 1A. Referring to FIG. 2A, the ADF 110 uses a feeding roller 11A to feed documents DCO sheet by sheet from an input tray 111 into the inlet 113, a series of conveyance rollers 11B-11G to convey the documents from the inlet 113 through a conveyance path to the outlet 115, and an ejecting roller 11H to eject the documents to the output tray 112. While passing the conveyance path, each document is, at the bottom surface of the ADF 110, irradiated with light from the scanner 120 so that one side of the document is scanned, and inside the ADF 110, irradiated with light from a reverse-side scanner 116 so that the other side of the document is scanned.

Configuration of Scanner

FIG. 2A also includes a cross-section view of the scanner 120 along the line II-II shown in FIG. 1A. Referring to FIG. 2A, the scanner 120 has a contact glass 121, which covers in a slit open at the top surface of the scanner 120 and faces an exposed portion of the conveyance path of documents at the bottom surface of the ADF 110. Through the contact glass 121, the scanner 120 irradiates with light one side of a document that passes through the portion of the conveyance path, and detects light reflected from the side of the document. The scanner 120 also has a platen glass 122, which covers another opening separate from the slit at the top surface of the scanner 120. Through the platen glass 122, the scanner 120 irradiates with light one side of a document that is placed on the platen glass 122, and detects light reflected from the side of the document.

The scanner 120 has a slider 123, which is mounted within the scanner 120 to be able to reciprocate between a position directly below the contact glass 121 and an edge of the platen glass 122. The slider 123 irradiates one side of a document with light from a line light source 128 through the top surface of the slider 123 and either the contact glass 121 or the platen glass 122. The slider 123 then reflects light, which has been reflected from the side of the document and then entered the top surface of the slider 123, with a mirror 129 toward a pair of mirrors 124, 125 and a lens 125. These optical elements 124, 125 focus the reflected light on a line sensor 126 to make it detect the intensity of the light. Since the intensity varies depending on colors (more accurately, light reflection rates) on the side of the document, electric signals that the line sensor 126 transmits in response to the detection of the intensity represent images displayed on the side of the document. Similarly, electric signals that the reverse-side scanner 116 transmits represent images displayed on another side of a document. The scanner 120 has an image processing circuit 127, which converts these electric signals into image data and transmits the image data to the printer 130 or an external electronic device.

Configuration of Printer

Figure 2B:
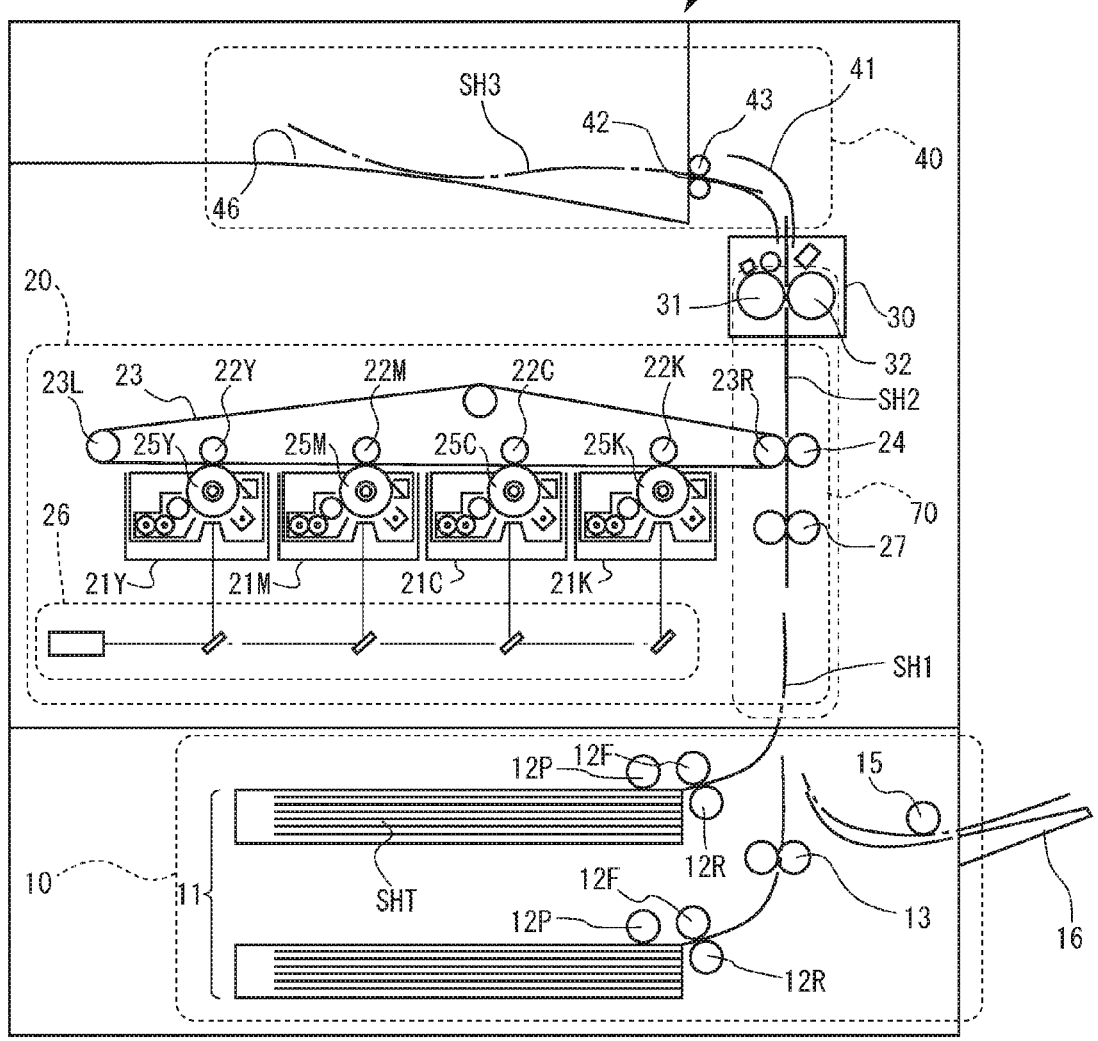
FIG. 2B is a front view illustrating a schematic configuration of the printer shown in FIG. 1A.

FIG. 2B is a front view illustrating a schematic configuration of the printer 130. FIG. 2B represents elements of the printer 130 as if they can be seen through the front face of the body. Referring to FIG. 2B, the printer 130 is an electrophotographic color printer, i.e. color laser printer, which includes a feeder section 10, an imaging section 20, a fixing section 30, and an ejecting section 40. These elements 10, 20, 30, 40 cooperate to form images on sheets based on image data while conveying the sheets within the body of the MFP 100.

The feeder section 10 uses feeder rollers 12P, 12F, 12R, 13, 15 to feed each sheet SH1 from a stack of sheets SHT stored in the paper cassettes 11 or on a manual feed tray 16, to the imaging section 20. The material of the sheets SHT is paper or resin; their paper type is plain, high-quality, coated, etc.; and their size is A3, A4, A5, B4, etc.

The imaging section 20 forms a toner image on a sheet SH2 conveyed from the feeder unit 10. More specifically, the imaging section 20 first makes four imaging units 21Y, 21M, 21C, 21K expose surfaces of their respective photoreceptor drums 25Y, 25M, 25C, 25K to laser lights from an exposure unit 26 in patterns based on image data, then forming electrostatic latent images on the surfaces. From the electrostatic latent images, the imaging units 21Y, . . . , 21K next develop toner images of their respective colors, i.e. yellow (Y), magenta (M), cyan (C), and black (K). The imaging units 21Y, . . . , 21K then transfer the resultant four one-colored toner images in order by electric fields between primary transfer rollers 22Y, 22M, 22C, 22K and the photoreceptor drums 25Y, . . . , 25K, and from the photoreceptor drums 25Y, . . . , 25K onto the same position on a surface of an intermediate transfer belt 23, thus forming a single four-colored toner image on the position. The imaging section 20 further transfers this color toner image by an electric field between the intermediate transfer belt 23 and a secondary transfer roller 24, onto a surface of the sheet SH2 passing through the nip between the intermediate transfer belt 23 and the secondary transfer roller 24. After that, the imaging section 20 applies a voltage to the sheet SH2 to separate it from the secondary transfer roller 24 and send it to the fixing unit 30.

The fixing section 30 thermally fixes the color toner image to the sheet SH2 conveyed from the imaging section 20. More specifically, when the sheet SH2 passes through the nip between a fixing roller 31 and a pressure roller 32, the fixing roller 31 applies heat from its built-in heater to the sheet SH2, and the pressure roller 32 applies pressure to the heated portion of the sheet SH2, pressing the sheet SH2 against the fixing roller 31. The heat from the fixing roller 31 and the pressure from the pressure roller 32 fix the toner image onto a surface of the sheet SH2. Then, the fixing section 30 transfers the sheet SH2 from its top portion along a guide board 41 to the ejection slot 42.

The ejecting section 40 uses an ejecting roller 43 to eject a sheet SH3 that the fixing section 30 sends out, from the ejection slot 42 and store it on the ejection tray 46.

Electronic Control System of Image Processing Device

Figure 3:
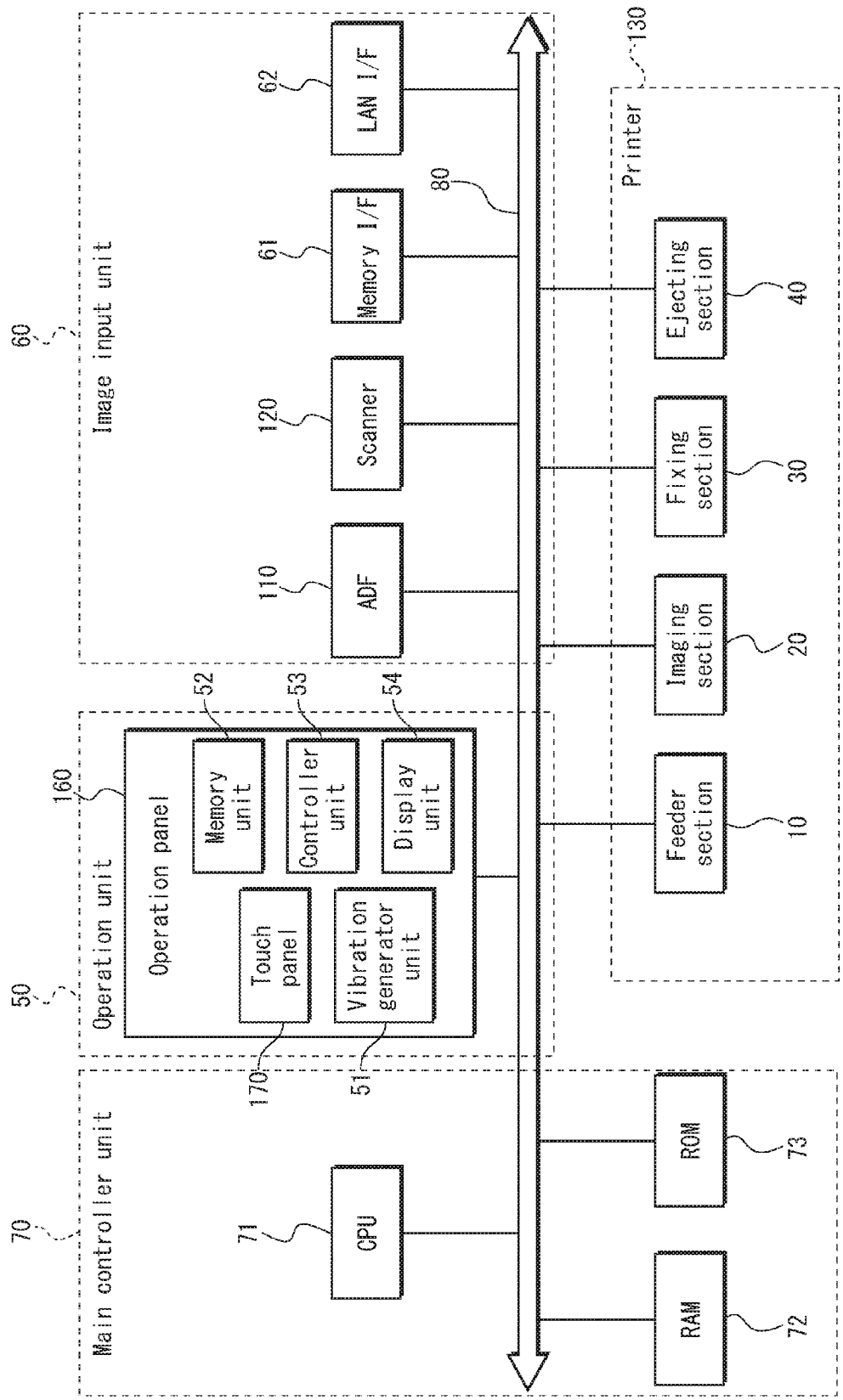
FIG. 3 is a block diagram illustrating a configuration of the electronic control system of the MFP shown in FIG. 1A.

FIG. 3 is a block diagram illustrating a configuration of the electronic control system of the MFP 100. Referring to FIG. 3, the electronic control system includes, in addition to the printer 130, an operation unit 50, an image input unit 60, and a main controller unit 70, which are connected to a bus 90 to be able to communicate with each other.

—Operation Unit—

The operation unit 50, which is the entirety of input devices mounted on the MFP 100 including the operation panel 160, accepts and interprets user operations, and informs the main controller unit 70 of same. The operation panel 160 includes, in addition to the touch panel 170, a vibration generator unit 51, a memory unit 52, a controller unit 53, and a display unit 54. The vibration generator unit 51, which is a combination of the piezoelectric actuator 174 shown in FIG. 1B and its driver circuit, drives the piezoelectric actuator 174 to apply vibration to the touch panel 170, in particular the display area of the operation screen. The memory unit 52 is a rewritable, non-volatile semiconductor memory device such as an electrically-erasable programmable read-only memory (EEPROM) and a flash memory, or a high-capacity, non-volatile storage device such as a hard disc drive (HDD) or a solid state drive (SSD). The memory unit 52, for example, stores firmware and application programs for making the controller unit 53 realize various functions of the operation panel 160, and provides the controller unit 53 with storage for data such as environmental variables. The controller unit 53, which is configured with an integrated circuit such as a microprocessor (MPU/CPU), an ASIC, or a FPGA, executes firmware, etc., stored in the memory unit 52 to realize various functions of the operation panel 160. The controller unit 53, in particular, accepts and interprets user's input operations through the touchpad 172 shown in FIG. 1B or the push buttons 161 shown in FIG. 1A, and based on the interpretation, generates information about the input operations, hereinafter referred to as "operation information," and transfers it to the main controller unit 70. The display unit 54 is a combination of the LCD 171, the control circuit board 175, and the IPC 176, which are shown in FIG. 1B, and a digital signal processor circuit (DSP) that provides them with image data in an appropriate format. In response to instructions from the main controller unit 70, the display unit 54 processes image data of a GUI screen such as the operation screen, thus reproducing the GUI screen on the touch panel 170.

—Image Input Unit—

The image input unit 60 includes, in addition to the ADF 110 and the scanner 120 shown in FIG. 2A, a memory interface (I/F) 61 and a network (LAN) I/F 62. The memory I/F 61, through a video input terminal such as a universal serial bus (USB) port or memory card slot, reads image data to be printed from an external memory device such as a USB memory, a HDD, or a SSD, and writes image data captured by the scanner 120 to the external memory device. The LAN I/F 62 has a wired or wireless connection to an external local area network or electronic device, and receives image data to be printed from the connected network or device, and transmits image data captured by the scanner 120.

—Main Controller Unit—

The main controller unit 70 is an integrated circuit implemented on a printed circuit board, which is mounted inside the MI-V 100. Referring to FIG. 3, the main controller unit 70 includes a CPU 71, a RAM 72, and a ROM 73. The CPU 71, which is configured with a single MPU, executes a variety of firmware to realize various functions of control over the other elements 10, 20, . . . , 50, and 60. For example, the CPU 71 makes the operation unit 50 display a GUI screen such as the operation screen and accept user's input operation. In response to each input operation, the CPU 71 selects an operation mode of the MFP 100 such as a running, waiting, or sleep mode, and instructs processes according to the operation mode to the other elements 10, . . . , 60. The RAM 72, which is a volatile semiconductor memory device such as a dynamic RAM (DRAM) or a static RAM (SRAM), provides the CPU 71 with a workspace to execute firmware and temporarily stores image data to be printed that the image input unit 60 receives. The ROM 73 consists of a non-writable, non-volatile memory device and a rewritable non-volatile memory device. The former stores firmware, and the latter includes a semiconductor memory device such as EEPROM, flash memory, or SSD, or a HDD, and provides the CPU 71 with storage for data such as environmental variables.

Functions of Operation Panel

Figure 4:
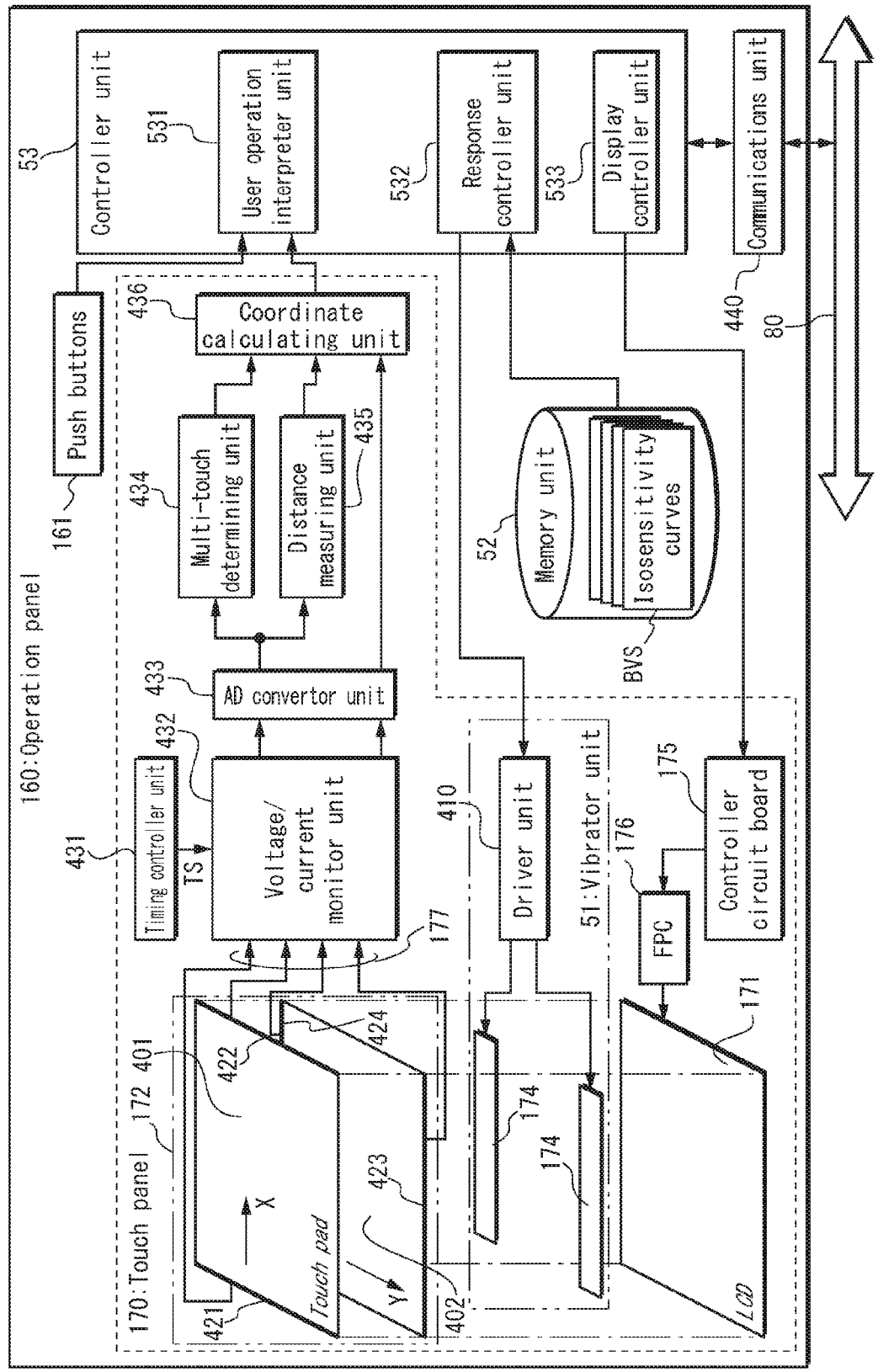
FIG. 4 is a functional block diagram of the operation panel shown in FIG. 1A.

FIG. 4 is a functional block diagram of the operation panel 160. Referring to FIG. 4, the touch panel 170 is of a 4-wire resistive type that supports multi-touch. More concretely, the touch panel 170 includes, in addition to the elements that FIG. 1B shows such as the LCD 171 and the touchpad 172, a timing controller unit 431, a voltage/current monitor unit 432, an analog-digital (AD) convertor unit 433, a multi-touch determining unit 434, a distance measuring unit 435, and a coordinate calculating unit 436. These elements 431-436 are electronic circuit modules, which are, for example, mounted on a print circuit board built in the operation panel 160, or implemented into a single integrated circuit. With these elements, the touch panel 170 detects a touch by a user's finger on the touchpad 172, and calculates the coordinate of the touch.

The controller unit 53 executes firmware or application programs stored in the memory unit 52 to function as a user operation interpreter unit 531, a response controller unit 532, and a display controller unit 533. The user operation interpreter unit 531 interprets user's input operation that the touchpad 172 or each push button 161 indicates to issue operation information. The response controller unit 532 enables the FNB function of the touch panel 170. More concretely, in response to a touch that the touch panel 170 has detected, the response controller unit 532 indicates, to the vibrator unit 51, an amplitude distribution in frequency of responsive vibration, i.e. a spectrum of the responsive vibration. According to the instruction, the vibrator unit 51 drives the piezoelectric actuator 174, thus applying responsive vibration to the touchpad 172. The display controller unit 533 serves as a DSP for the LCD 171, the controller circuit board 175, and the FPC 176. More specifically, the display controller unit 533, in response to instructions of the main controller unit 70, processes and sends image data of GUI screens to the controller circuit board 175, thus making the FPC 176 use the image data for modulation in brightness of each pixel of the LCD 171. Thus, the GUI screens are reproduced on the touch panel 170.

The communications unit 440 connects the controller unit 53 to the bus 80 so that the controller unit 53 can communicate with the bus 80. Through the bus 80, the communications unit 440 receives an instruction and image data from the main controller unit 70 and transmits them to the controller unit 53, and sends to the main controller unit 70 operation information and the like that the controller unit 53.

—Sensing of Touch by Touch Panel—

The touchpad 172 includes two transparent, rectangular-shaped, conductive films 401, 402, such as ITO thin films. These films 401, 402 are stacked in parallel one on top of the other, keeping a fixed distance therebetween. The upper film 401 includes a first electrode 421 and a second electrode 422 along either of its shorter sides, and has constant electric resistivity in the direction of its longer sides, the direction of x axis in FIG. 4. The lower film 402 includes a third electrode 423 and a fourth electrode 424 along either of its longer sides, and has constant electric resistivity in the direction of its shorter sides, the direction of y axis in FIG. 4. Every electrode 421, . . . , 424 is connected to the voltage/current monitor unit 432 via the cables 177.

The timing controller unit 431 uses a built-in clock to generate a timing signal TS at a constant frequency of, e.g. a few dozen kHz, and send the signal to the voltage/current monitor unit 432. In synchronization with this timing signal TS, the voltage/current monitor unit 432 repeats the following actions (1) and (2) in turn: (1) applying a bias voltage between the first electrode 421 and the second electrode 422 to monitor the amount of current flowing therebetween, and at the same time, keeping the third electrode 423 and the fourth electrode 424 in a high-impedance state, in which each electrode has a resistance sufficiently higher than that of the entirety of each conductive film 401, 402, to monitor the potential of each electrode; and (2) applying a bias voltage between the third electrode 423 and the fourth electrode 424 to monitor the amount of current flowing therebetween, and at the same time, keeping the first electrode 421 and the second electrode 422 in a high-impedance state to monitor the potential of each electrode. The AD convertor unit 433 converts analog values of the potential and current amount that the voltage/current monitor unit 432 measures into digital values.

The multi-touch determining unit 434 monitors the digital value of the current amount sent from the AD convertor unit 433, and if the current amount exceeds a reference value, informs the coordinate calculating unit 436 of detection of a multi-touch. This reference value indicates, during the action (1) of the voltage/current monitor unit 432, the amount of current that flows between the first electrode 421 and the second electrode 422 in the case of the two conductive films 401, 402 short-circuiting at only one point, and during the action (2), the amount of current that flows between the third electrode 423 and the fourth electrode 424 in the same case. If the films 401, 402 short-circuit at two or more points simultaneously, current flows between the points through either of the films in parallel. In contrast to the case of the films 401, 402 short-circuiting at only one point, the resistance value between the first electrode 421 and the second electrode 422 is reduced during the action (1), and the resistance value between the third electrode 423 and the fourth electrode 424 is reduced during the action (2). As a result, the amounts of the current between the electrode pairs 421-422 and 423-424 exceed the respective reference values. These exceeding current amounts thus show that the films 401, 402 short-circuit at two or more points, i.e. multi-touches.

The distance measuring unit 435 monitors the digital value of the current amount sent from the AD convertor unit 433 to estimate, from the current amount, the distance between two points at which the two conductive films 401, 402 short-circuit simultaneously. As described above, the films 401, 402 short-circuiting at two or more points, in contrast to those short-circuiting at only one point, reduce the resistance value between the first electrode 421 and the second electrode 422 during the action (1), and the resistance value between the third electrode 423 and the fourth electrode 424 during the action (2). The reduction of each resistance value is substantially determined by the distance between two points at which the films 401, 402 seems to be short-circuiting simultaneously. Using this relationship, the distance measuring unit 435 estimates the distance from the difference between the amount of current flowing through each electrode pair 421-422, 423-424 and the reference value.

The coordinate calculating unit 436 monitors the digital value of the potential of each electrode 421, . . . , 424 sent from the AD convertor unit 433 to calculate from the potential the coordinate of the point at which a user's finger touches on the touch panel 170 as follows.

During the action (1) of the voltage/current monitor unit 432, the bias voltage and constant electric resistivity between the first electrode 421 and the second electrode 422 causes a constant potential gradient in the direction of the longer sides of the upper conductive film 401, i.e., the direction of the x axis. Under this condition, the upper film 401 comes into contact with the lower film 402 within a range, and then both the third electrode 423 and the fourth electrode 424 have substantially the same potential as the center point of the range since these electrodes 423, 424 are kept in the high-impedance state. The potential of the center point is determined by the voltage division ratio of the resistances of two regions: one is from the first electrode 421 to the center point, and the other is from the center point to the second electrode 422. This voltage division ratio is equal to the ratio in which the center point internally divides the distance from the first electrode 421 to the second electrode 422, i.e. the ratio of the distance from the first electrode 421 to the center point and the distance from the center point to the second electrode 422.

In view of this discussion, the coordinate calculating unit 436 first detects the change in the potentials of the third electrode 423 and the fourth electrode 424 to determine the voltage division ratio in the short-circuiting range from the potentials after the change, the potential of the first electrode 421 or the second electrode 422, and the bias voltage between these electrodes 421, 422. The coordinate calculating unit 436 next calculates, from the voltage division ratio, the distance between the center point and the first electrode 421 or the second electrode 422 as the coordinate of the center point in the direction of the longer sides of the conductive films 401, 402, i.e. the x coordinate of the center point shown in FIG. 4. When the output of the multi-touch determining unit 434 indicates no detected multi-touch, the coordinate calculating unit 436 transmits the coordinate of the center point as the coordinate of a single touch in the direction of the longer sides of the films 401, 402, i.e. the x coordinate of the touch. When the output of the multi-touch determining unit 434 indicates a detected multi-touch, the coordinate calculating unit 436 transmits both the sum of the coordinate of the center point plus a half of the distance provided by the distance measuring unit 435 and the difference of the coordinate minus the half of the distance, as the coordinates of double touches in the direction of the longer sides of the films 401, 402, i.e. the x coordinates of the touches.

During the action (2) of the voltage/current monitor unit 432, the bias voltage and constant electric resistivity between the third electrode 423 and the fourth electrode 424 causes a constant potential gradient in the direction of the shorter sides of the lower conductive film 402, i.e., the direction of the y axis. Both the first electrode 421 and the second electrode 422 have substantially the same potential as the center point of the range in which the two conductive films 401, 402 short-circuit since these electrodes 421, 422 are kept in the high-impedance state. The potential of the center point is determined by the voltage division ratio of the resistances of two regions: one is from the third electrode 423 to the center point, and the other is from the center point to the fourth electrode 424. This voltage division ratio is equal to the ratio in which the center point internally divides the distance from the third electrode 423 to the fourth electrode 424.

In view of this discussion, the coordinate calculating unit 436 first detects the change in the potentials of the first electrode 421 and the second electrode 422 to determine the voltage division ratio in the short-circuiting range from the potentials after the change, the potential of the third electrode 423 or the fourth electrode 424, and the bias voltage between the electrodes 423, 424. The coordinate calculating unit 436 next calculates, from the voltage division ratio, the distance between the center point and the third electrode 423 or the fourth electrode 424. Depending on whether or not the output of the multi-touch determining unit 434 indicates a detected multi-touch, the coordinate calculating unit 436 further transmits the calculated distance itself, or a pair of the sum and difference between the calculated distance and a half of the distance provided by the distance measuring unit 435, as the coordinate(s) of touch(es) in the direction of the shorter sides of the two conductive films 401, 402, i.e. the y coordinate(s) of the touch(es).

—Interpretation of User Operation—

The user operation interpreter unit 531 checks the coordinate of a touch received from the coordinate calculating unit 436 against the coordinates of gadgets, such as virtual buttons and menu items, included in a GUI screen to select, from among the gadgets, a possible target for user operation. Referring to temporal change in the coordinates of touches, the user operation interpreter unit 531 further discriminates among types of gesture, such as tap, flick, slide, and rotation, and based on the possible target and the types, interprets input operation indicated by the user's gesture. In addition, the user operation interpreter unit 531 monitors whether any of the push buttons 161 on the operation panel 160 is pushed or not, and if any of the push buttons is pushed, the unit identifies the pushed button to interpret the process assigned to the button as start or stop of print or the like. Based on the interpretation, the user operation interpreter unit 531 generates operation information and informs the main controller unit 70 of the operation information.

—Generation of Responsive Vibration (FFB)—

As FIG. 4 shows, the vibrator unit 51 includes a driver unit 410, which is a driving circuit for the piezoelectric actuator 174, periodically applying a voltage across the actuator 174. The driver unit 410, in particular, adjusts the spectrum of the waveform of the voltage to a spectrum of responsive vibration indicated by the response controller unit 532. This causes the spectrum of vibration applied from the piezoelectric actuator 174 to the touchpad 172 to substantially conform to the spectrum of responsive vibration.

The response controller unit 532 determines the spectrum of responsive vibration as follows. The response controller unit 532 first detects the fact that the touch panel 170 has sensed a touch from the fact that the user operation interpreter unit 531 has received the coordinate of the touch from the coordinate calculating unit 436. In response to the reception, the user operation interpreter unit 531 selects a gadget as the possible target for user operation, and then the response controller unit 532 determines whether or not the gadget is one of types to be responded with vibration. The types are selected to meet the condition that they should allow a user to perceive a tactile feedback in response to his/her touch. When the possible target for user operation is one of the types, the response controller unit 532 refers to the main controller unit 70 for whether all elements of the image processing unit, i.e. all of the ADF 110, the scanner 120, and the printer 130 are under the waiting condition, or at least one of them is under the operating condition. When all the elements 110, 120, and 130 of the image processing unit are waiting, the response controller unit 532 assigns a first spectrum to the spectrum of responsive vibration. The first spectrum is specified by firmware or an application program stored in the memory unit 52, for example, and usually has a pattern varying for the different types of gadgets, such as virtual buttons, menus, and toolbars, to be responded with vibration, or for the different types of gesture, such as tap, flick, and slide. When an element 110, 120, or 130 of the image processing unit is operating, the response controller unit 532 deforms the first spectrum into a second spectrum, and assigns the second spectrum to the spectrum of responsive vibration. The second spectrum indicates a lower level of responsive vibration than the first spectrum.

—Spectrum of Responsive Vibration—

Responsive vibration is applied from the piezoelectric actuator 174 to the touchpad 172. Then, the touchpad 172 resonates with components of the responsive vibration that have frequencies equal to the natural frequencies of the touchpad 172. Accordingly, the spectrum of the responsive vibration is expressed as combination of vibration levels at the different natural frequencies of the touchpad 172, such as a combination of vibration intensities or acceleration rates of a medium.

Figure 5A:
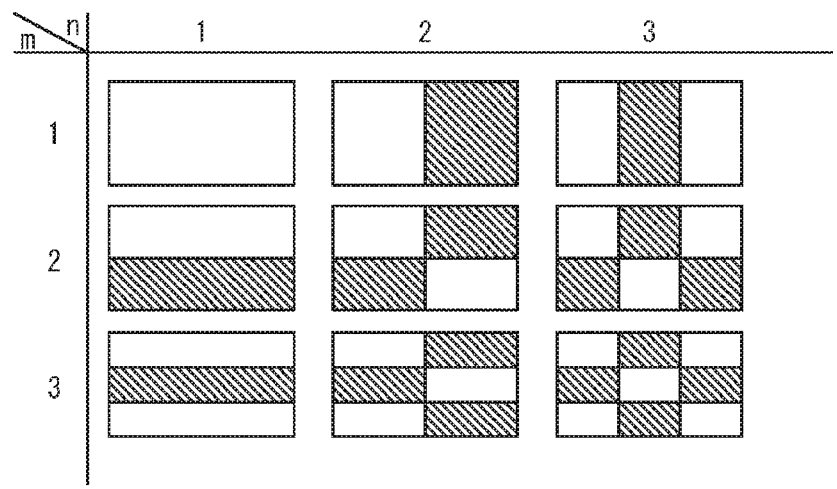
FIG. 5A is a tabulated list of node curves of natural vibration modes (m=1, 2, 3; n=1, 2, 3) of the touchpad shown in FIG. 4.

FIG. 5A is a tabulated list of node curves of natural vibration modes (m=1, 2, 3; n=1, 2, 3) of the touchpad 172. In FIG. 5A, each square represents the outline of the touchpad 172, and each boundary line between blank and hatched areas represents a "node curve" of natural vibration, i.e. locations at which vibration levels steadily equal to zero. Since every side of the touchpad 172 is fixed on the LCD 171, each node curve appears within the touchpad 172 as a line parallel to the longer or shorter side of the touchpad. A value m, which is the sum of one plus the number of node lines parallel to the longer side of the touchpad 172, is referred to as an "order for the longer-side direction," and another value n, which is the sum of one plus the number of the node lines parallel to the shorter side of the touchpad 172, is referred to as an "order for the shorter-side direction." Pairs (m, n) of these orders distinguish the natural vibration modes. Either of the orders m, n can be any integer of one or more. In general, the larger the number m+n−2 of node curves is, the higher the natural frequency is.

Figure 5B:
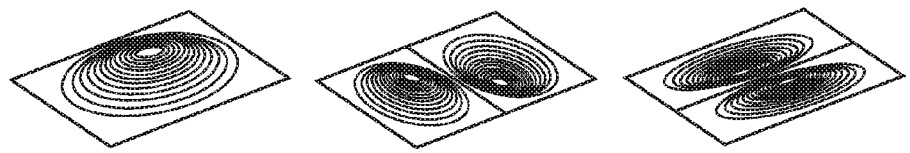
FIG. 5B is a schematic drawing showing shapes of natural vibration modes (m, n)=(1, 1), (1, 2), and (2, 1)
Figure 5C:
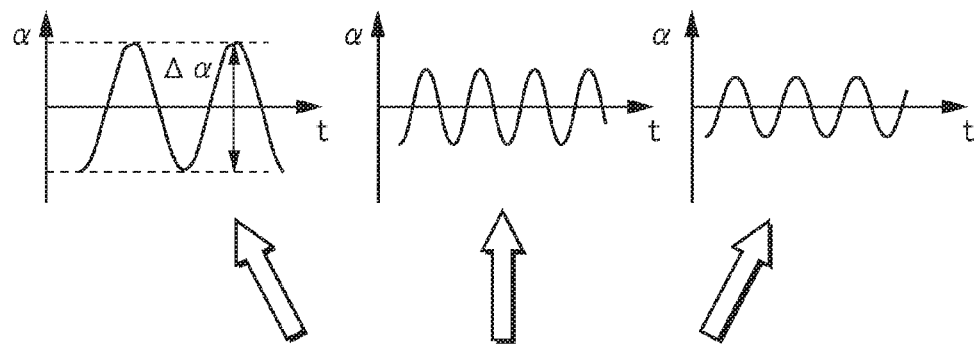
FIG. 5C is a graph of the waveform of each mode.

FIG. 5B is a schematic drawing showing shapes of natural vibration modes (m, n)=(1, 1), (1, 2), and (2, 1). FIG. 5C is a graph of the waveform of each mode. Curves that FIG. 5B shows represent contour lines on the surface of the touchpad 172. Temporal changes in the height of each point within the surface entail temporal changes in the acceleration rate of the point. These changes are expressed by the graph of FIG. 5C. Referring to FIG. 5B, the lowest-order mode (m, n)=(1, 1) has no node lines within the touchpad 172, and accordingly the entirety of the surface vibrates in its normal direction in the same phase to change the heights of points within the surface to form a sinusoidal wave. The modes (m, n)=(1, 2), (2, 1) at the next lowest natural frequency have only one node line within the touchpad 172, and both portions of the surface facing across the node line vibrate in its normal direction in the opposite phases. More specifically, one of the portions bulges upward to form a convex shape while the other dips downward to form a concave shape. Within each portion, the heights of points change to form the same sinusoidal wave.

Figure 5D:
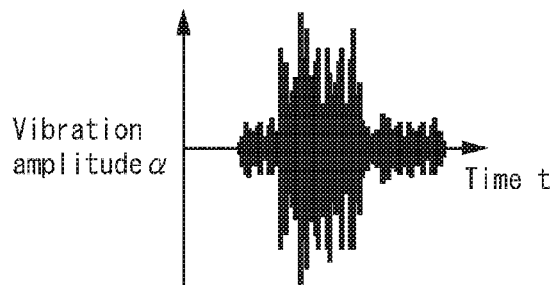
FIG. 5D is a graph of the waveform of an actual vibration appearing on the touchpad.

FIG. 5D is a graph of the waveform of an actual vibration appearing on the touchpad 172. Referring to FIG. 5D, the actual vibration has such a complicate waveform. This vibration is, however, a composite of the sinusoidal waves in FIG. 5C with different amplitudes $\Delta\alpha$ among the natural vibration modes in FIG. 5A. Thus, responsive vibration is expressed by a combination of the amplitudes $\Delta\alpha$ in intensity $\alpha$ among the natural vibration modes (m, n).

Figure 6:
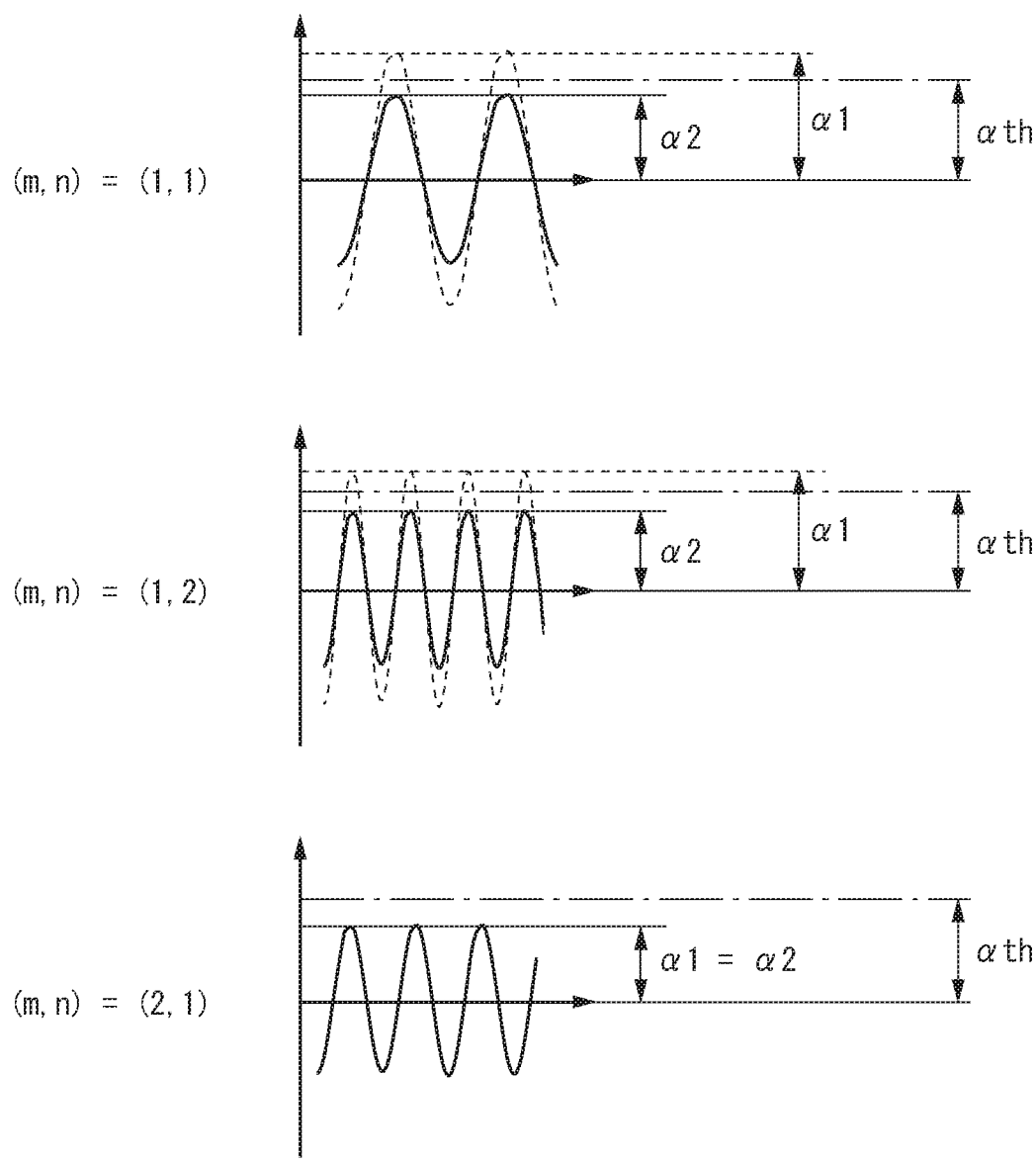
FIG. 6 is a graph of the waveform of the natural vibration modes (m, n)=(1, 1), (1, 2), (2, 1) that responsive vibration includes.

FIG. 6 is a graph of the waveform of the natural vibration modes (m, n)=(1, 1), (1, 2), (2, 1) that responsive vibration includes. In FIG. 6, broken lines show the first spectrum, and bold lines show the second spectrum. As these waveforms show, the level $\alpha2$ of each mode in the second spectrum is lower than the level $\alpha1$ of the same mode in the first spectrum, and not higher than a threshold value $\alpha$th. This threshold value $\alpha$th indicates the intensity of responsive vibration that can adversely affect action of any of the elements 110, . . . , of the image processing unit to an extent no higher than an acceptable upper limit.

Let us explain that more concretely. For example, when the ADF 110 is conveying a document, the threshold value $\alpha$th is determined so that responsive vibration displaces the document on the contact glass 121, at the largest, to the extent of displacement that can provide only invisible distortion to any image that the scanner 120 captures from the document. When the slider 123 of the scanner 120 is moving, the threshold value $\alpha$th is determined so that responsive vibration displaces the slider 123, at the largest, to the extent of displacement that can provide only invisible distortion to any image that the scanner 120 captures from the document. When the printer 130 is printing on a sheet, the threshold value $\alpha$th is determined so that responsive vibration displaces the sheet itself, any roller 12P, . . . , conveying the sheet, any PC drum 25Y, . . . , the intermediate transfer belt 23, or any transfer roller 22Y, . . . , 24, at the largest, to the extent of displacement that can provide only invisible distortion to any toner image formed on the sheet.

In general, the threshold value $\alpha$th varies in level depending on which of the ADF 110, the scanner 120, and the printer 130 is operating. When the same element is operating, the threshold value $\alpha$th usually varies within a negligible range among the different natural vibration modes. Thus, the response controller unit 532 sets the threshold value $\alpha$th to different levels depending on which element 110, . . . of the image processing unit is operating, and applies the value as a common threshold value to any natural vibration mode.

When an element 110, . . . , of the image processing unit is operating, the response controller unit 532 first compares the level $\alpha1$ of each natural vibration mode included in the first spectrum with the threshold value $\alpha$th. If the level $\alpha1$ exceeds the threshold value $\alpha$th, the response controller unit sets the level $\alpha2$ of the same mode included in the second spectrum to a value not higher than the threshold value $\alpha$th. By applying a similar process to every mode included in the first spectrum, the response controller unit 532 deforms the first spectrum into the second spectrum.

Let us explain that more concretely. For example, the first spectrum that FIG. 6 shows has the lowest and the next lowest natural vibration modes (m, n)=(1, 1), (1, 2) whose levels α1 exceed the threshold value αth. Accordingly, the response controller unit 532 sets the levels α2 of these modes included in the second spectrum to the threshold value αth. The first spectrum also has the other next lowest natural vibration mode (m, n)=(2, 1) whose level α1 does not exceed the threshold value αth. Thus, the response controller unit 532 sets, to this level α1, the level α2 of the same mode included in the second spectrum.

Procedure of FFB Process by Touch Panel

Figure 7B:
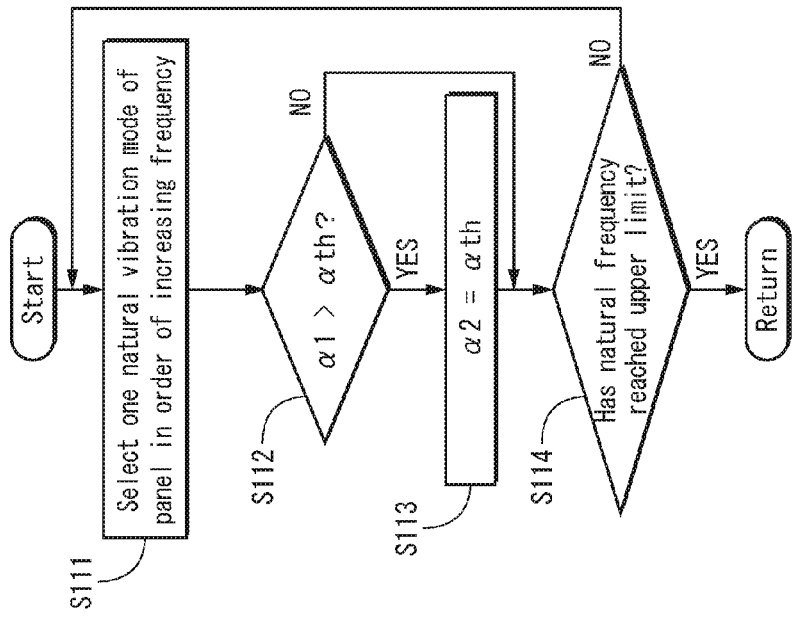
FIG. 7B is a flowchart of the subroutine for deformation of the spectrum of responsive vibration from the first to the second spectrum at step S105.
Figure 7A:
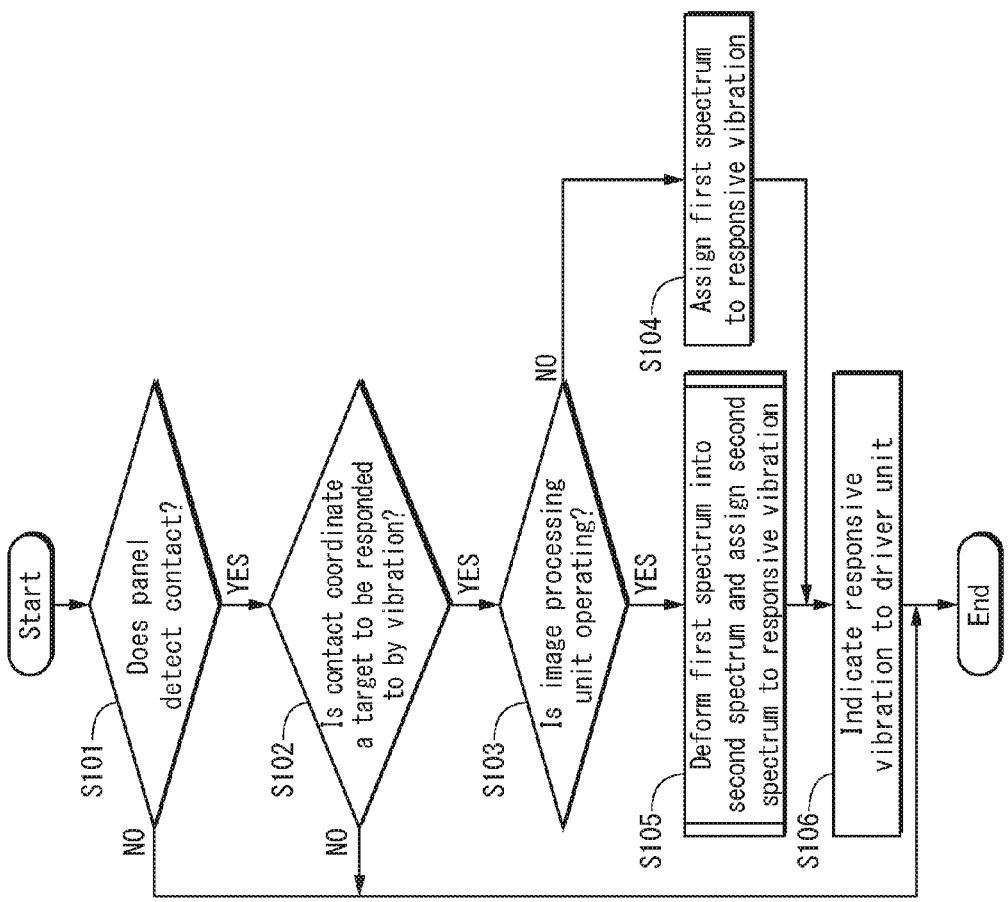
FIG. 7A is a flowchart of the FFB process by the touch panel.

FIG. 7A is a flowchart of the FFB process by the touch panel 170. This process starts when the display unit 54, in response to an instruction from the main controller unit 70, reproduces a GUI screen such as the operation screen on the display region on the touch panel 170, and then repeats at regular intervals during the display of the GUI screen, for example at the horizontal scanning frequency of the LCD 71, i.e. a frequency of several dozen kHz.

At step S101, the response controller unit 532 checks whether or not the touch panel 170 has detected a touch of a user's finger or the like, more concretely, whether or not the user operation interpreter unit 531 has received the coordinate of a touch from the coordinate calculating unit 436. If received, the process proceeds to step S102, and if not, the process ends.

At step S102, the user operation interpreter unit 531 has received the coordinate of a touch from the coordinate calculating unit 436. Accordingly, the response controller unit 532 checks whether or not the gadget that, based on the coordinate, the user operation interpreter unit 531 has selected as a possible target for user operation, is one of the types to be responded with vibration. If so, the process proceeds to step S103, and if not, the process ends.

At step S103, the gadget selected as a possible target for user operation is one of the types to be responded with vibration. Thus, the response controller unit 532 refers to the main controller unit 70 for whether all the elements 110, 120, 130 of the image processing unit are under the waiting condition, or at least one of them is under the operating condition. If all the elements are waiting, the process proceeds to step S104, and if one of them is operating, the process proceeds to step S105.

At step S104, all the elements 110, 120, 130 of the image processing unit are under the waiting condition. Accordingly, the response controller unit 532 assigns the first spectrum to the spectrum of responsive vibration. Then, the process proceeds to step S106.

At step S105, at least one of the elements 110, 120, 130 of the image processing unit is under the operating condition. Accordingly, the response controller unit 532 deforms the first spectrum into the second spectrum, and assigns the second spectrum to the spectrum of responsive vibration. Then, the process proceeds to step S106.

At step S106, the response controller unit 532 indicates, to the driver unit 410 of the vibrator unit 51, the spectrum of responsive vibration set at step S104 or S105. Then, the process ends.

FIG. 7B is a flowchart of the subroutine for deformation of the spectrum of responsive vibration from the first to the second spectrum at step S105.

At step S111, the response controller unit 532 selects one of the natural vibration modes (m, n) of the touchpad 172 in order of increasing natural frequency. Then, the process proceeds to step S112.

At step S112, the response controller unit 532 checks whether or not, in the first spectrum, the natural vibration mode (m, n) selected at step S111 has a level α1 exceeding the threshold value αth. If the level α1 exceeds the threshold value αth, the process proceeds to step S113, and if not, the process proceeds to step S114.

At step S113, the natural vibration mode (m, n) selected at step S111 has a level α1 exceeding the threshold value αth. Accordingly, the response controller unit 532 sets the level α2 of the same mode included in the second spectrum to the threshold value αth. Then, the process proceeds to step S114.

At step S114, the response controller unit 532 checks whether or not the natural frequency of the natural vibration mode (m, n) selected at step S111 reaches an upper limit. This upper limit is set within a range of levels perceivable to fingers of users. If the natural frequency does not reach the upper limit, the process repeats from step S111, and if it does, the process returns to step S106 shown in FIG. 7A.

Merit of Embodiment

In the operation panel 160 of the MIT 100 according to the embodiment of the invention, when the touch panel 170 senses a touch, the response controller unit 532 indicates the spectrum of responsive vibration to the vibrator unit 51, as described above. This spectrum is set to the first spectrum when any of the elements 110, 120, 130 of the image processing unit is under waiting condition at the time the touch is sensed, and to the second spectrum when one of them is under operating condition. Since the natural vibration mode at a level exceeding the threshold value αth in the first spectrum is at a level suppressed to the threshold value αth in the second spectrum, the intensity of the responsive vibration is lowered under the operating condition of the image processing unit than under the waiting condition thereof. Therefore, the MFP 100 enables a user to perceive the responsive vibration of the operation panel 160 without adverse effect on its own image processing.

Modifications (A) The image processing device 100 that FIG. 1A shows is the MFP. Alternatively, an image processing device according to an embodiment of the invention may be any single-function device, e.g. a laser printer, a printer of another type such as an inkjet type, a copier, a scanner, a fax machine.

(B) The operation unit 50 may allow a user to customize responsive vibration. More concretely, the operation unit 50 may make the display unit 54 display a setting screen for parameters specifying responsive vibration as one portion of the operation screen, for example. The parameters include, e.g. the intensity and frequency of vibration, and the interval of intermittent vibrations. Through the setting screen, the operation unit 50 accepts the user's entry of indexes representing the user's preference about responsive vibration. The indexes, which are hereinafter referred to as "preference indexes," include an increment or decrement of each level of responsive vibration, and an upper or lower limit to be set for each level, for example. The preference indexes may have values that vary depending on which of the ADF 110, the scanner 120, and the printer 130 is operating. The operation unit 50 makes the main controller unit 70 store the accepted preference indexes into the ROM 73. According to these preference indexes, the response controller unit 532 updates the first spectrum, and sets the parameters specifying responsive vibration to designated values corresponding to the preference indexes. In this case, a designated value for the level of a natural vibration mode included in responsive vibration may exceed the threshold value αth. The response controller unit 532 may use all the designated values in the settings of responsive vibration, without changing any of them, when all the elements 110, 120, 130 of the image processing unit are waiting at the time the touch panel 170 has sensed a touch, or when one of the elements 110, . . . is operating but the designated values include the intensity of responsive vibration that is no higher than the threshold value αth. On the other hand, when one of the elements 110, . . . is operating at the time and the designated values include the intensity of responsive vibration exceeds the threshold value αth, the response controller unit 532 may combine the designated values other than the intensity of vibration with another intensity of vibration no higher than the threshold value αth, and use the combination in the settings of responsive vibration.

(C) The touch panel 170 that FIG. 4 shows is of a 4-wire resistive type that supports multi-touch by using the two resistive films. The touch panel, alternatively, may be of any other known type, such as a 5-wire resistive type, a multi-touch-compatible resistive type with a matrix of resistive films, an electrostatic capacitance type, or an optical type. In the structure of any of these types, the vibrator unit can apply vibration to the touchpad allowing users' fingers to touch it, or to a protector member that covers the touchpad, such as a sheet, film, or panel.

(D) As FIG. 1B and FIG. 4 show, the pair of the piezoelectric actuators 174 are used in applying vibration to the touchpad 172. Not limited to the arrangement that FIG. 1B and FIG. 4 show, a piezoelectric actuator may be arranged on every side of the touchpad 172, for example. Instead of a piezoelectric actuator, an eccentric rotating mass (ERM) motor, or a voice coil motor may be used in applying vibration to the touchpad 172.

(E) The spectra of vibration that FIG. 5 and FIG. 6 show represent the level of vibration with the intensity of vibration α, i.e. the acceleration rate of a medium. Each spectrum may alternatively represent the level of vibration with the velocity or displacement of the medium.

(F) The threshold value αth that FIG. 6 shows is set to a different level depending on which of the elements 110, 120, and 130 of the image processing unit is operating, but has a common level among all the natural vibration modes included in the spectrum of resistive vibration. Alternatively, the threshold value αth may be fixed to a common level regardless of which element 110, . . . of the image processing unit is operating, when the threshold value αth varies within a negligible range among the elements 110, . . . When an extent to which responsive vibration adversely affect the image processing unit during its operating varies with the frequency of the vibration in a non-negligible manner, the threshold value αth may be set to a different level for a different natural vibration mode. Furthermore, the threshold value αth may be set to a different level depending on the thickness, type, basis weight, or conveyance speed of a sheet to be processed. More concretely, a thinner sheet, a sheet with a smoother surface, a lighter sheet, and a sheet moving at a lower speed are subject to a larger displacement caused by external vibration, and thus, may entail the lower level of the threshold value αth.

(G) In the FFB process that FIG. 7 shows, the response controller unit 532 replaces the level α1 of any natural vibration mode in the first spectrum with the threshold value αth whenever the level α1 exceeds the threshold value αth, thus deforming the first spectrum into the second spectrum. The response controller unit 532, alternatively, may eliminate from the first spectrum every natural vibration mode of the level α1 exceeding the threshold value αth, thus deforming the first spectrum into the second spectrum. Instead of deforming the first spectrum into the second spectrum, the response controller unit 532 may stop the vibrator unit 51 at least during the operation of the image processing unit 110, . . . In any of the above-mentioned ways, responsive vibration can avoid an adverse effect on the operation of the image processing unit 110, . . . .

The response controller unit 532 may use an isosensitivity curve for user's sensation of vibration in the deformation from the first to the second spectrum. This can reduce the level of responsive vibration without causing a user to notice the difference in responsive vibration between the waiting and operating conditions of the image processing unit, thus avoiding an adverse effect on the operation of the image processing unit.

The "isosensitivity curve" means a curve expressing, in a vibration parameter space, a group of vibratory stimuli that have physically different vibration levels but cause a person to perceive the same level. See, for example, "Ningen-Kogaku handbook (in Japanese)," Ito Seiji, et al., Jun. 20, 2013, Asakura Shoten, p. 78, FIG. 2. The response controller unit 532 may select values of vibration parameters such that the level of responsive vibration changes along the same isosensitivity curve during the waiting of the image processing unit 110, . . . as during the operating thereof. In this case, reduction in the level of responsive vibration can be hardly noticeable for users.

Figure 8A:
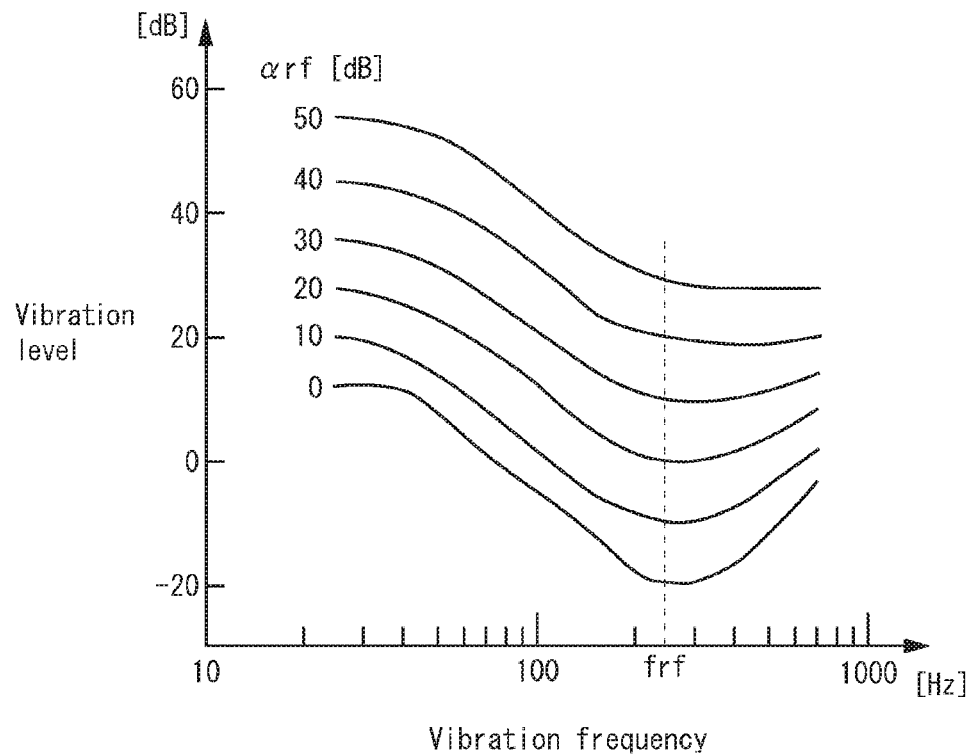
FIG. 8A is a graph showing isosensitivity curves of a human hand for vibratory stimuli.

FIG. 8A is a graph showing isosensitivity curves of a human hand for vibratory stimuli. Referring to FIG. 8A, these isosensitivity curves are drawn in a two dimensional space represented by two types of vibration parameters, "vibration levels" and "vibration frequencies." Each curve expresses a group of vibratory stimuli that subjects perceive at the same intensity level as that of the reference vibration of a constant frequency frf, e.g. 250 Hz. Different curves express different physical levels αrf of the reference vibration. Data BVS showing these curves is stored in the memory unit 52, for example. The response controller unit 532, when indicating the spectrum of responsive vibration to the vibrator unit 51, refers to the data BVS to use in deformation from the first to the second spectrum.

Figure 8B:
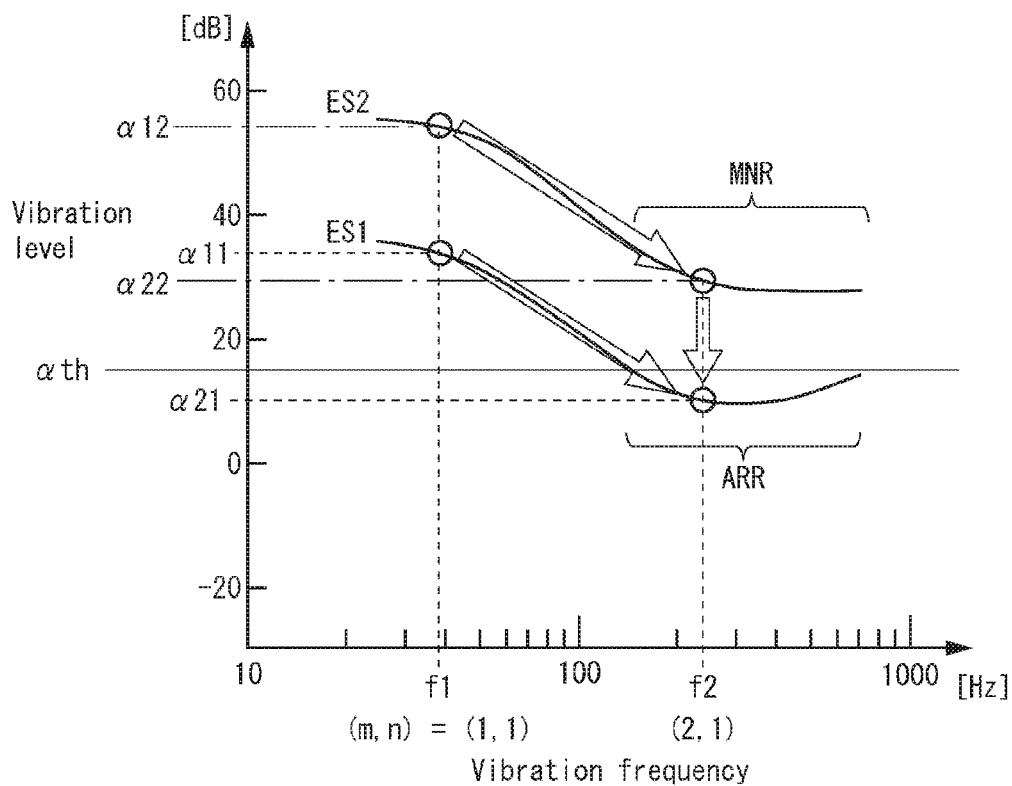
FIG. 8B is a graph showing a method of deforming the spectrum of responsive vibration by using the isosensitivity curves.

FIG. 8B is a graph showing a method of deforming the spectrum of responsive vibration by using the isosensitivity curves that FIG. 8A shows. Referring to FIG. 8B, one of the natural vibration modes in the first spectrum, (m, n)=(1, 1), has a level exceeding the threshold value αth. Accordingly, the response controller unit 532, when deforming the first spectrum into the second one, sets a mode with which the mode (m, n)=(1, 1) is to be replaced in the second spectrum as follows.

First, suppose that a portion ARR can be found in the isosensitivity curve on which the natural frequency-vibration level pair (f1, α1) of the mode (m, n)=(1, 1) is located. The portion ARR has vibration levels no higher than the threshold value αth, like a portion of the isosensitivity curve ES1 for the reference vibration with level αrf=30 dB, for example. In this case, the response controller unit 532 selects a natural vibration mode that has a natural frequency belonging to the frequency band of the portion ARR, e.g. the mode (m, n)=(2, 1) whose natural frequency is the lowest value f2. The response controller unit 532 sets into the second spectrum the vibration level α21 of this mode that the portion ARR shows.

Next, suppose that no portion with vibration levels no higher than the threshold value αth can be found in the isosensitivity curve on which the natural frequency-vibration level pair (f1, α1) of the mode (m, n)=(1, 1) is located, like the isosensitivity curve ES2 for the reference vibration with level αrf=50 dB, for example. In this case, the response controller unit 532 first searches the isosensitivity curve ES2 for a portion MNR with the lowest vibration level to select a natural vibration mode that has a natural frequency belonging to the portion MNR, e.g. the mode (m, n)=(2, 1) whose natural frequency is the lowest value f2. Since the vibration level α22 of this mode exceeds the threshold value αth, the response controller unit 532 next searches another isosensitivity curve on which the vibration level of this mode is no higher than the threshold value αth, e.g. the isosensitivity curve ES1 for the reference vibration with level arf=30 dB. Since, on this curve ES1, the vibration level α21 of the mode (m, n)=(2, 1) is no higher than the threshold value αth, the response controller unit 532 sets the vibration level α21 of this mode into the second spectrum.

Figure 9:
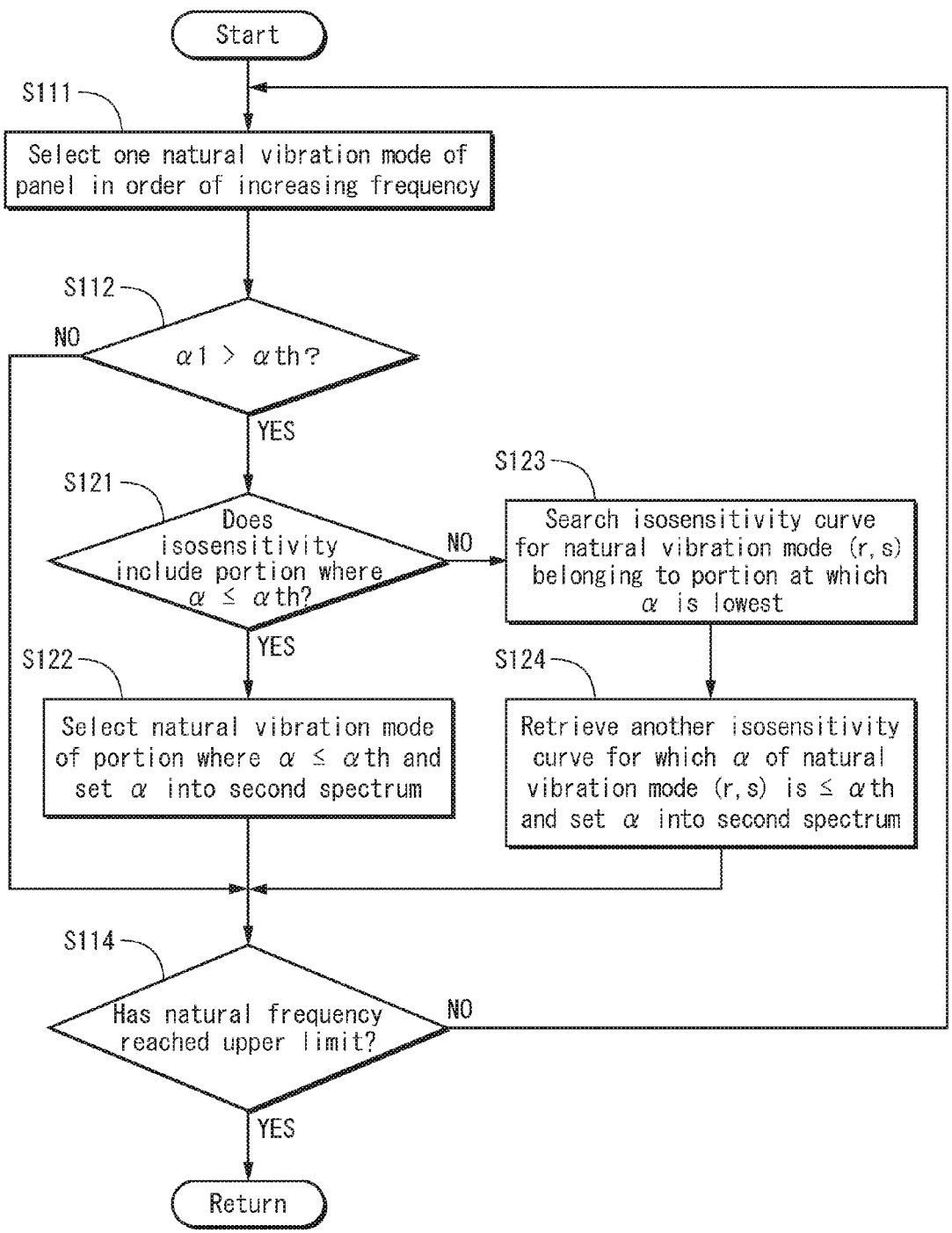
FIG. 9 is a flowchart of the subroutine for using isosensitivity curves in the deformation of the spectrum of responsive vibration at step S105 that FIG. 7A shows.

FIG. 9 is a flowchart of the subroutine for using isosensitivity curves in the deformation of the spectrum of responsive vibration at step S105 that FIG. 7A shows. Referring to FIG. 9, this process includes similar steps to those of the process that FIG. 7B except for steps S121-S124 that replace S113. These similar steps are marked with the same reference symbols as those shown in FIG. 7B.

At step S111, the response controller unit 532 selects one of the natural vibration modes (m, n) of the touchpad 172 in order of increasing natural frequency. Then, the process proceeds to step S112.

At step S112, the response controller unit 532 checks whether or not, in the first spectrum, the natural vibration mode (m, n) selected at step S111 has a level a1 exceeding the threshold value αth. If the level α1 exceeds the threshold value αth, the process proceeds to step S121, and if not, the process proceeds to step S114.

At step S121, the natural vibration mode (m, n) selected at step S111 has a level α11 or α12 exceeding the threshold value αth. Accordingly, the response controller unit 532 retrieves from the data BVS the isosensitivity curve ES1 or ES2 on which the natural frequency-vibration level pair (f1, α11) or (f1, α12) of the mode (m, n) is located, and searches the isosensitivity curve ES1 or ES2 for a portion with vibration levels no higher than the threshold value αth. If the portion is found, the process proceeds to step S122, and if not, the process proceeds to step S123.

At step S122, the portion ARR can be found in the isosensitivity curve ES1 retrieved at step S121, which has vibration levels no higher than the threshold value αth. The response controller unit 532 selects a natural vibration mode (p, q) that has a natural frequency belonging to the frequency band of the portion ARR, and then sets into the second spectrum the vibration level α2 of this mode (p, q) that the portion ARR shows. Then, the process proceeds to step S114.

At step S123, no portion with vibration levels no higher than the threshold value αth can be found in the isosensitivity curve ES2 retrieved at step S121. The response controller unit 532 searches the isosensitivity curve ES2 for a portion MNR with the lowest vibration level to select a natural vibration mode that has a natural frequency belonging to the portion MNR, e.g. the mode (r, s) whose natural frequency is the lowest value f2. Then, the process proceeds to step S124.

At step S124, the response controller unit 532 retrieves another isosensitivity curve ES1 on which the vibration level of the mode (r, s) selected at step S123 is no higher than the threshold value αth, and then sets the vibration level α2 of this mode (r, s) into the second spectrum. Then, the process proceeds to step S114.

At step S114, the response controller unit 532 checks whether or not the natural frequency of the natural vibration mode (m, n) selected at step S111 reaches an upper limit. If the natural frequency does not reach the upper limit, the process repeats from step S111, and if it does, the process returns to step S106 shown in FIG. 7A.

As described above, when the natural vibration mode (m, n) included in the first spectrum has a level α1 exceeding the threshold value αth, the response controller unit 532 searches the isosensitivity curve on which the natural frequency-vibration level pair of the mode (m, n) is located, for a portion with vibration levels no higher than the threshold value αth. If such a portion ARR is found on the isosensitivity curve ES1, the response controller unit 532 selects a natural vibration mode (p, q) from the portion ARR, and then sets the vibration level α2 of this mode (p, q) into the second spectrum. This results in the levels α1 and α2 of responsive vibration changing along the same isosensitivity curve ES1 both in the first and second spectra. Thus, the MFP 100 enables responsive vibration to keep the same psychological intensity for users but reduce the physical intensity to a level that provides no adverse effect on the image processing of the MFP 100.

Even if failing to find any portion with vibration levels no higher than the threshold value αth in the isosensitivity curve ES2, the response controller unit 532 select a natural vibration mode (r, s) from a portion MNR with the lowest vibration level of the isosensitivity curve ES2, and from another isosensitivity curve ES1 on which the vibration level α2 of this mode (r, s) is no higher than the threshold value αth, sets the vibration level α2 into the second spectrum. This results in minimizing the difference in psychological intensity between the mode (m, n) in the first spectrum with the vibration level α1 exceeding the threshold value αth, and the replacement mode (r, s) in the second spectrum with the vibration level α2 no higher than the threshold value αth. Thus, the MFP 100 hardly makes users notice the reduction in the physical intensity of responsive vibration to a level that provides no adverse effect on the image processing of the MFP 100.

Supplement

Based on the above-described embodiment, the invention may be further characterized as follows.

The response controller unit preferentially determines as a threshold value a level of vibration applied by the vibrator unit to the display region that causes no more than an acceptable negative effect on the operation of the image processing unit, and the response controller unit preferentially sets the responsive vibration to a level no higher than the threshold value if the image processing unit is under the operating condition at the time when the touch panel senses the object.

The operation screen preferentially includes a setting screen for at least one of vibration parameters specifying the responsive vibration. When this is the case, the response controller unit sets one of the vibration parameters that should be used if the image processing unit is under the waiting condition at the time the touch panel senses the object, to a designated value indicated by user operation on the setting screen. When the designated value is a level of vibration no higher than the threshold value, the response controller unit sets one of the vibration parameters that should be used if the image processing unit is under the operating condition at the time the touch panel senses the object, to the designated value. When the designated value is a level of vibration exceeding the threshold value, the response controller unit sets one of the vibration parameters that should be used if the image processing unit is under the operating condition at the time the touch panel senses the object, to another level of vibration no higher than the threshold value.

The image processing device preferentially includes a storage unit storing therein data representing isosensitivity curves for user's sensation of vibration, the curves being drawn in a space of vibration parameters specifying the responsive vibration. When this is the case, the response controller unit uses the data to select values of the vibration parameters such that a point showing the level of the responsive vibration is plotted on the same isosensitivity curve both when the image processing unit is under the waiting condition and under the operating condition. The response controller unit further determines as a threshold value a level of vibration applied by the vibrator unit to the display region that causes no more than an acceptable negative effect on the operation of the image processing unit. When the image processing unit is under the operating condition at the time the touch panel senses the object, the response controller unit searches the isosensitivity curve for a portion showing a level of vibration no higher than the threshold value, and if finding the portion, the response controller unit selects, within the range of the vibration parameters specifying the portion, values of the vibration parameters specifying the responsive vibration. Furthermore, the response controller unit, if failing to find the portion showing a level of vibration no higher than the threshold value, searches the isosensitivity curve for another portion showing the lowest level of vibration, and the response controller unit combines the values of the vibration parameters specifying the other portion, other than the lowest level of vibration, with another level of vibration no higher than the threshold value, and provides the combination to the vibrator unit.

The operation screen preferentially includes a setting screen for at least one of the vibration parameters specifying the responsive vibration. When this is the case, the response controller unit sets one of the vibration parameters that should be used if the image processing unit is under the waiting condition at the time the touch panel senses the object, to a designated value indicated by user operation on the setting screen. When the designated value is a level of vibration no higher than the threshold value, the response controller unit sets one of the vibration parameters that should be used if the image processing unit is under the operating condition at the time the touch panel senses the object, to the designated value. When the designated value is a level of vibration exceeding the threshold value, the response controller unit searches an isosensitivity curve to which the designated value belong, for a portion showing a level of vibration no higher than the threshold value.

The vibration parameters preferentially include, in addition to a level of vibration, at least one of frequency vibration and interval of intermittent vibrations.

The image processing unit preferentially includes a scanner unit configured to capture an image from a sheet; and an image forming unit configured to print an image onto a sheet. When this is the case, the response controller unit sets the threshold value to values that are different for operation of the scanner and for operation of the image forming unit.

The image processing unit, while conveying a sheet, may capture an image from the sheet and/or print an image onto the sheet. When this is the case, the response controller unit preferentially sets the threshold value to a value varying with types and conveyance speeds of the sheet.

The response controller unit preferentially stops the vibrator unit if the image forming unit is under the operating condition at the time the touch panel sense the object.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing device comprising:
   an image processing unit configured to capture an image from a sheet and/or print an image on a sheet;
   a housing supporting the image processing unit inside itself; and
   an operation panel mounted on the housing and configured to display an operation screen for the image processing unit to accept user operation on the operation screen, the operation panel including:
   a touch panel having a display region for the operation screen and configured to sense an outer object touching the display region;
   a vibrator unit configured to apply vibration to the display region; and
   a response controller unit configured to, in response to the touch panel sensing the object, instruct the vibrator unit to apply to the display region vibration responsive to the object, the response controller unit also configured to check whether the image processing unit is under waiting or operating condition at the time the touch panel senses the object, and when the image processing unit is under the operating condition, set the responsive vibration to a level lower than when the image processing unit is under the waiting condition.

2. The image processing device according to claim 1, wherein
   the response controller unit determines as a threshold value a level of vibration applied by the vibrator unit to the display region that causes no more than an acceptable negative effect on the operation of the image processing unit, and
   the response controller unit sets the responsive vibration to a level no higher than the threshold value if the image processing unit is under the operating condition at the time when the touch panel senses the object.

3. The image processing device according to claim 2, wherein
   the operation screen includes a setting screen for at least one of vibration parameters specifying the responsive vibration,
   the response controller unit sets one of the vibration parameters that should be used if the image processing unit is under the waiting condition at the time the touch panel senses the object, to a designated value indicated by user operation on the setting screen,
   when the designated value is a level of vibration no higher than the threshold value, the response controller unit sets one of the vibration parameters that should be used if the image processing unit is under the operating condition at the time the touch panel senses the object, to the designated value, and
   when the designated value is a level of vibration exceeding the threshold value, the response controller unit sets one of the vibration parameters that should be used if the image processing unit is under the operating condition at the time the touch panel senses the object, to another level of vibration no higher than the threshold value.

4. The image processing device according to claim 3, wherein, after the response controller unit provides the vibrator unit with a value of one of the vibration parameters different from the designated value and the image processing unit returns to the waiting condition, the response controller unit resets the value of one of the vibration parameters to the designated value when sending the first instruction for the responsive vibration to the vibrator unit.

5. The image processing device according to claim 3, wherein the vibration parameters include, in addition to a level of vibration, at least one of frequency of vibration and interval of intermittent vibrations.

6. The image processing device according to claim 2, wherein
the image processing unit includes:
a scanner unit configured to capture an image from a sheet; and
an image forming unit configured to print an image onto a sheet,
and
the response controller unit sets the threshold value to values that are different for operation of the scanner and for operation of the image forming unit.

7. The image processing device according to claim 2, wherein
the image processing unit, while conveying a sheet, captures an image from the sheet and/or prints an image onto the sheet; and
the response controller unit sets the threshold value to a value varying with types and conveyance speeds of the sheet.

8. The image processing device according to claim 1, further comprising
a storage unit storing therein data representing isosensitivity curves for user's sensation of vibration, the curves being drawn in a space of vibration parameters specifying the responsive vibration, wherein
the response controller unit uses the data to select values of the vibration parameters such that a point showing the level of the responsive vibration is plotted on the same isosensitivity curve both when the image processing unit is under the waiting condition and under the operating condition.

9. The image processing device according to claim 8, wherein
the response controller unit determines as a threshold value a level of vibration applied by the vibrator unit to the display region that causes no more than an acceptable negative effect on the operation of the image processing unit,
when the image processing unit is under the operating condition at the time the touch panel senses the object, the response controller unit searches the isosensitivity curve for a portion showing a level of vibration no higher than the threshold value, and
if finding the portion the response controller unit selects, within the range of the vibration parameters specifying the portion, values of the vibration parameters specifying the responsive vibration.

10. The image processing device according to claim 9, wherein
the response controller unit, if failing to find the portion showing a level of vibration no higher than the threshold value, searches the isosensitivity curve for another portion showing the lowest, level of vibration, and
the response controller unit combines the values of the vibration parameters specifying the other portion, other than the lowest level of vibration, with another level of vibration no higher than the threshold value, and provides the combination to the vibrator unit.

11. The image processing device according to claim 9, wherein
the operation screen includes a setting screen for at least one of the vibration parameters specifying the responsive vibration,
the response controller unit sets one of the vibration parameters that should be used if the image processing unit is under the waiting condition at the time the touch panel senses the object, to a designated value indicated by user operation on the setting screen,
when the designated value is a level of vibration no higher than the threshold value, the response controller unit sets one of the vibration parameters that should be used if the image processing unit is under the operating condition at the time the touch panel senses the object, to the designated value, and
when the designated value is a level of vibration exceeding the threshold value, the response controller unit searches an isosensitivity curve to which the designated value belong, for a portion showing a level of vibration no higher than the threshold value.

12. The image processing device according claim 1, wherein the response controller unit stops the vibrator unit if the image forming unit is under the operating condition at the time the touch panel senses the object.

13. The image processing device according claim 1, wherein, under the operating condition, the image processing unit captures the image from the sheet or prints the image from the sheet, and in the waiting condition, the image processing unit does not capture the image from the sheet and does not print, the image from the sheet.

* * * * *